2,806,542

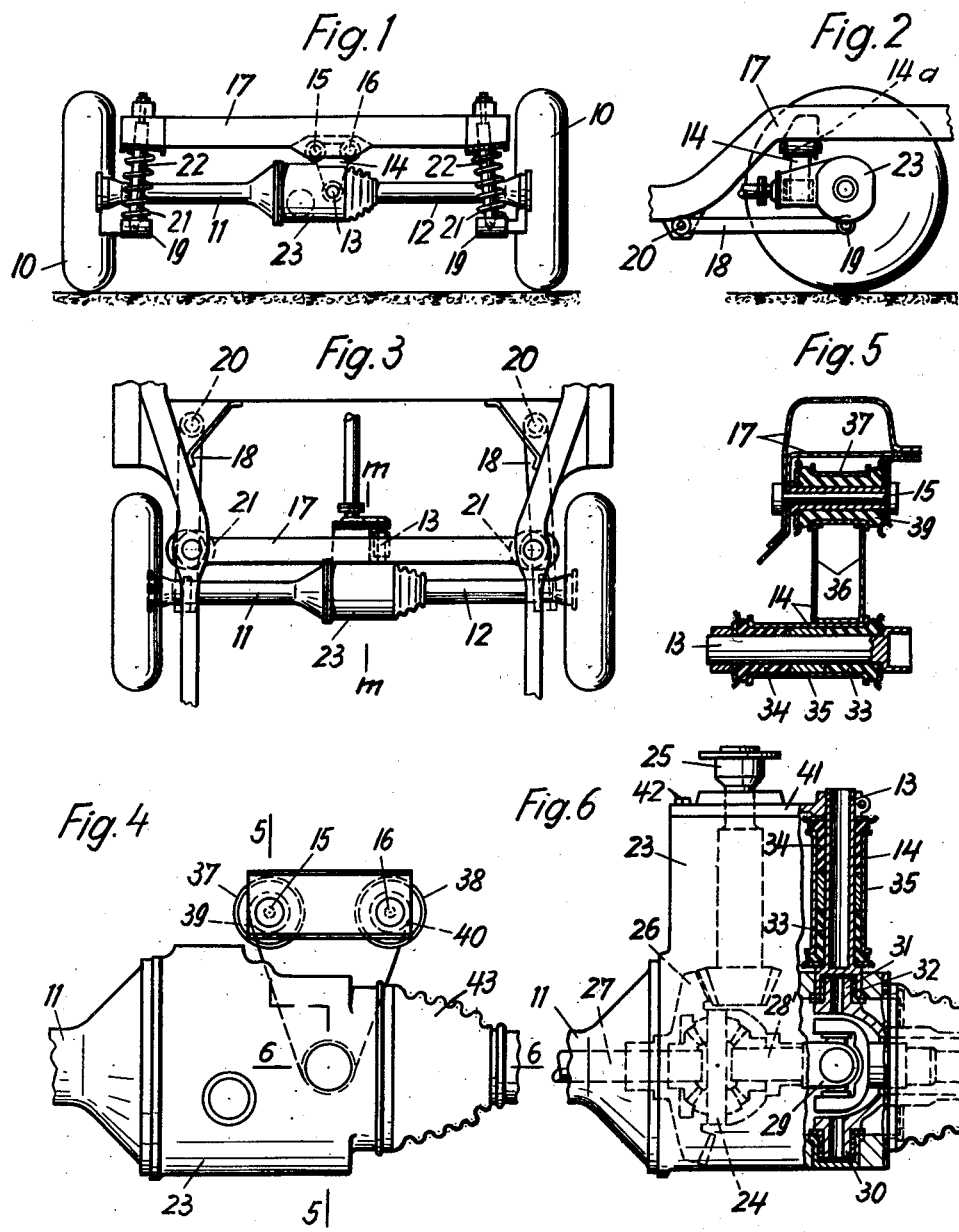

SUSPENSION OF SWINGING HALF AXLES IN AUTOMOBILES

Hans O. Scherenberg, Stuttgart-Heumaden, and Josef Müller, Stuttgart, Germany, assignors to Daimler-Benz Aktiengesellschaft, Stuttgart-Unterturkheim, Germany Application September 3, 1954, Serial No. 454,106

Claims priority, application Germany September 4, 1953

11 Claims. (Cl. 180—73)

This invention relates to a method of suspending pendulum type swinging half axles in automobiles equipped with driven wheels and with an axle gear, particularly a differential gear, arranged on one of the half axles and swinging therewith about the common link joint of the half axles on the superstructure of the vehicle.

An object of the present invention is a simplification in design and construction which, at the same time, enables the pendulum length of the half axles to be enlarged and thereby lessens the inclination of the supporting line connecting the point of contact between road wheels and road to the link-joint axis of the half axle as well as reduces variation in the amount of camber obtained thereby.

A further object of the present invention is to provide a more advantageous distribution of the weight of the axle aggregate and a convenient arrangement of the link joint and axle gear.

Another object of the present invention is to provide an axle gear which, though connected to one of the half axles and swinging therewith about the link joint thereof, enables a conventional drive to be used without difficulty and an advantageous distribution of the weight of the half axles including the thrust rods therefor to be obtained.

Another object of the present invention is to provide a simplified and cheaper construction and method of manufacture respectively.

Another object of the present invention is to provide an improved absorption of the forces and shocks transmitted from the road wheels to the vehicle.

Still another object of the present invention is such a suspension of the swinging half axles that when both wheels are lifted simultaneously they remain exactly in the direction of travel, and that even when one wheel only is deflected the deviation from the direction of travel is slight and practically negligible.

Another object of the present invention is to provide an elastic type of suspension of the swinging half axles and the joints thereof on the superstructure which is particularly advantageous for absorbing the forces which occur and which is particularly favorable for the existing kinematic conditions.

An embodiment of the invention is disclosed in the accompanying drawings, in which:

Fig. 1 is a rear elevational view of the axle unit;

Fig. 2 is a side elevation thereof;

Fig. 3 is a plan view of the axle unit shown in Fig. 1;

Fig. 4 is an enlarged elevational view of the pendulum half axle and axle gear suspension corresponding to Fig. 1;

Fig. 5 is a sectional elevation corresponding to Fig. 2, as taken on the line 5—5 of Fig. 4;

Fig. 6 is a plan view of the embodiment shown in Fig. 4, partly in section as taken on the line 6—6 of Fig. 4, the embodiment according to Figs. 4 to 6 being slightly modified as compared with that shown in Figs. 1 to 3.

In the accompanying drawings, reference numeral 10 designates the rear wheels of an automobile, which are supported on the outer ends of the pendulum half axles 11 and 12. The inner ends of the pendulum half axles are supported in a common pivot 13 arranged on a bracket 14 in the longitudinal direction of the vehicle, said bracket 14 being fastened to the automobile frame 17 by means of two studs 15 and 16. The outer ends of the pendulum half axles 11 and 12 are supported against the frame by longitudinal radius arms 18. Said radius arms 18 are, on the one hand, connected to the half axles by means of studs 19 which are each fixedly secured to the respective wheel or brake carrier and the pendulum half axle 11 or 12 respectively, preferably with rubber sleeves interposed therebetween, and on the other, pivoted universally yieldingly at pivot points 20 on the frame 17, preferably also with rubber buffers interposed therebetween. As to half axle 11, the center point of member 19 and pivot point 20 are disposed at two apices of a triangle constituted by imaginary lines connecting these points with a point 14a midway of the axis of stud 15.

As shown in Figures 3 and 6, pivot 13 and joint 29 are disposed with a longitudinal axis on one side of the central longitudinal plane m—m of the vehicle, and the axle driving gearing is disposed on the opposite side of this plane. This disposition of these parts effects an advantageous distribution of the weight thereof.

A further desirable distribution of weight is to be found in the assembly of the parts constituting the half axles 11 and 12 together with the wheels 10 and radius arms 18. The parts pertaining to one-half axle are of substantially equal mass to those corresponding parts pertaining to the other half axle and as shown in Figure 3 the two sets of parts are symmetrically distributed relative to the central longitudinal vertical plane m—m. During the travel of the vehicle, member 19 moves in response to spring-controlled movements of the wheels 10 in an arc about the pivot point 20, which with point 14a, remains stationary relative to the vehicle frame.

With this construction a certain inclination of the entire axle aggregate to a horizontal plane of the vehicle may take place depending upon the relative up-and-down movements of the wheels during the travel of the vehicle. This inclination is relatively slight, however, due to the construction disclosed. As will be appreciated, the rubber bushings 39, 40 provide the necessary resilience for movement of the member 14 or of the axle aggregate. The half axles are cushioned by coil springs 21 which abut with their bottom ends against the longitudinal radius arms 18 and with their top ends, against the frame 17. The shocks are cushioned conveniently by means of telescopic shock absorbers 22 which are located in located in known manner within the coil springs 21. A rubber sleeve 43 may be connected between the pendulum half axle 12 and the axle gear casing 23 to effectively seal the openings between these two parts against road dirt, dust, et cetera.

The driving power is transmitted to the wheels through an axle gear, the casing 23 of which is either formed as a unit with the swinging half axle 11 or fixedly secured thereto, so that it participates in the swinging movements of the half axle 11 about the axis of the pivot 13. Mounted in known manner in the axle gear casing is the differential gear 24 (Fig. 6) which is driven by the driving shaft 25 and the bevel gear 26 from the engine through a propeller shaft and which in turn drives the shaft 27 within the pendulum half axle 11 as well as the short shaft 28' which is connected by means of a universal joint 29 located in the axis of the pivot 13 to the driving shaft 28 within the pendulum half axle 12. The axle gear, the pivot 13 and the universal joint 29, respectively, are arranged as closely adjacent to each other as possible on each side of the vertical longitudinal central plane m—m of the vehicle so that the drive shafts 27 and 28 are of equal length and mutually interchangeable.

The half axle 12 is pivoted by pivots 30 and 31 to the axle gear casing 23 which forms a part of the half axle 11, the bearing 31 being supported in the enlarged end 32 of the pivot 13 with a bearing bushing interposed therebetween. The pivot 13 which may be made hollow is supported at its forward end in a bearing formed by a lateral projection of cover plate 41 secured to the forward end of the axle gear casing 23, for example, by bolts 42. The pivot 13 is further supported in a bearing bracket of casing 14 with one (Figs. 1 to 3) or more (Figs. 4 to 6) rubber bushings 33, 34 interposed therebetween, said bearing bracket or casing being welded together, as shown particularly in Fig. 5, from the parts consisting of the tubular bearing member 35, the vertical webs 36 and the two upper sleeve-shaped eyes 37 and 38. Fitted in the upper eyes 37, 38 are rubber bushings 39, 40 which have been pushed on to studs 15, 16. The studs 15, 16 are in turn fastened with their ends to parts of the frame 17.

As the wheels are deflected the pendulum half axles 11 and 12 swing about the axis of the common link joint 13, the rubber buffers 33, 34 and 39, 40 permitting, within certain limits, a universal flexibility of the axle unit. Shearing forces then arising at the wheels are transmitted to the frame mainly by the longitudinal radius arms 18.

The types of suspension in accordance with the present invention for swinging half axles has the advantage that only a single link joint for the half axles is required, and that a separate suspension for the axle gear casing on the superstructure of the vehicle may be dispensed with.

Furthermore, the wheel suspension in accordance with the present invention permits the use of drive shafts 27 and 28 of equal length so as to be mutually interchangeable which entails reductions in the cost of manufacture, assembly, and repair.

Further, the suspension in accordance with the present invention whereby the swinging half axles are connected to each other and to the superstructure by means of hinge joints with the axes of the joints disposed in the direction of travel and whereby the half axles are supported in the direction of travel by longitudinal radius arms, resilient members being interposed where necessary, enables the entire axle unit to follow the swinging movements of the longitudinal radius arms owing to the resilience provided between the half axles and the superstructure and offers the advantage over lateral swinging half axles pivoted by means of ball joints that when both wheels are lifted simultaneously, they remain exactly in the direction of travel, and that even when one wheel only is deflected, the deviation from the direction of travel is slight and practically negligible.

The forces acting upon the wheels are effectively taken up by the longitudinal radius arms so that the torque developed by the power unit may be absorbed much more efficiently due to the increased leverage provided.

What we claim is:

1. In an automobile, a suspension on the superstructure for swinging pendulum half axles each carrying a road wheel, comprising means for hingedly connecting both pendulum half axles to the superstructure by means of a common link joint, an axle gear casing rigidly connected with one of said pendulum half axles containing an axle gear, and means for driving said axle gear by the driving engine of the automobile, the axis of the common link joint and the longitudinal axis of the axle gear being located on opposite sides of the vertical longitudinal central plane of the vehicle.

2. In an automobile, the combination as claimed in claim 1, wherein the axis of the axle gear driving means and the axis of the common link joint are disposed symmetrically to the vertical longitudinal central plane of the vehicle.

3. In an automobile, the combination as claimed in claim 1, further comprising drive shafts within the swinging half axles, each connecting the axle gear to one of the wheels, the axle gear and the common link joint of the half axles being so arranged on each side of the vertical longitudinal central plane of the automobile that the transversely disposed wheel driving shafts which are operatively connected together by means including said axle gear and a universal joint within the half axles in the axis of the common link joint are of equal length.

4. In an automobile, the combination as claimed in claim 1, wherein the common link joint of the swinging half axles is formed by hinge-joint members connecting together the half axles, the axis of said common link joint being positioned parallel to the direction of travel of the vehicle, further comprising thrust arms supporting the half axles against the superstructure in the direction of travel, means for flexibly connecting said thrust arms with said superstructure, means for flexibly connecting said thrust arms with said half axles near the outer ends thereof, a bearing bracket, means at said bearing bracket for supporting the inner ends of said axles by said common link joint, end means for flexibly connecting said bearing bracket with said superstructure, said three last-mentioned means for flexibly connecting being arranged in a triangle as seen in a side view of the vehicle.

5. The combination as claimed in claim 4, further comprising rubber members arranged in said common link joint of the swinging half axles.

6. The combination as claimed in claim 5, wherein said rubber members comprise at least one rubber bushing arranged concentrically with the link joint axis.

7. The combination as claimed in claim 4, wherein the means for flexibly connecting said bearing bracket with said superstructure includes rubber-like elements.

8. The combination as claimed in claim 7, further comprising rubber bushings in the link joint of the swinging half axles for yieldingly supporting the same on the bearing bracket.

9. The combination as claimed in claim 7, wherein said means for flexibly connecting said bearing bracket with said superstructure comprises studs disposed substantially parallel to the link joint axis of the swinging half axles, and rubber bushings arranged concentrically with said studs.

10. The combination as claimed in claim 1 with a pivot arranged on the axle gear casing to form the common link joint of the swinging half axles for the purpose of pivoting said half axles on the superstructure, each end of said pivot being supported on the axle gear casing, and means for suspending said pivot on the superstructure between the two ends thereof.

11. The combination as claimed in claim 10, with a casing cover for the axle drive casing on the side of the said driving means, wherein one end of the pivot serves at the same time as a bearing element for that swinging half axle which does not carry the axle gear, and wherein the other end of the pivot is inserted in a hole drilled in a casing cover covering the axle gear casing on that side where the propeller shaft is connected.

References Cited in the file of this patent

UNITED STATES PATENTS

| | | |
|---|---|---|
| 2,055,975 | Haltenberger | Sept. 29, 1936 |
| 2,105,369 | Paton | Jan. 11, 1938 |
| 2,145,670 | Tjaarda | Jan. 31, 1939 |
| 2,417,325 | Roos | Mar. 11, 1947 |
| 2,689,015 | Nallinger | Sept. 14, 1954 |